US012516551B2

(12) United States Patent
Tan et al.

(10) Patent No.: US 12,516,551 B2
(45) Date of Patent: Jan. 6, 2026

(54) INTEGRATED SECURITY LOCK

(71) Applicant: DELL PRODUCTS L.P., Round Rock, TX (US)

(72) Inventors: Danilo O. Tan, Austin, TX (US); Geroncio O. Tan, Austin, TX (US); Daniel L. Hamlin, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 168 days.

(21) Appl. No.: 18/499,947

(22) Filed: Nov. 1, 2023

(65) Prior Publication Data

US 2025/0137298 A1 May 1, 2025

(51) Int. Cl.

*E05B 73/00* (2006.01)
*E05B 47/02* (2006.01)
*E05B 47/00* (2006.01)

(52) U.S. Cl.

CPC ........ *E05B 73/0082* (2013.01); *E05B 47/026* (2013.01); *E05B 2047/0016* (2013.01); *E05B 2047/0081* (2013.01); *E05B 2073/0088* (2013.01)

(58) Field of Classification Search

CPC ............... E05B 73/0082; E05B 47/026; E05B 2047/0016; E05B 2047/0081; E05B 2073/0088

See application file for complete search history.

(56) References Cited

U.S. PATENT DOCUMENTS

| | | | | |
|---|---|---|---|---|
| 7,249,474 | B2 | 7/2007 | Avganim | |
| 9,187,934 | B1 * | 11/2015 | Lee | E05B 73/0017 |
| 9,222,285 | B1 * | 12/2015 | Ilislamloo | G08B 3/10 |
| 2007/0169523 | A1 * | 7/2007 | Lu | E05B 73/0082 70/58 |
| 2011/0116862 | A1 * | 5/2011 | Lo | G06F 1/1656 403/326 |
| 2012/0017656 | A1 * | 1/2012 | Senatori | G06F 21/88 70/57 |
| 2014/0116098 | A1 * | 5/2014 | Lin | E05B 73/0082 70/15 |
| 2014/0345335 | A1 * | 11/2014 | Lin | E05B 73/0082 70/15 |
| 2018/0209179 | A1 * | 7/2018 | Lin | E05B 73/0082 |
| 2019/0284843 | A1 | 9/2019 | Weng | |
| 2020/0173201 | A1 * | 6/2020 | Avganim | E05B 73/0005 |
| 2021/0047866 | A1 * | 2/2021 | Chen | E05B 17/2019 |

* cited by examiner

*Primary Examiner* — Mark A Williams
(74) *Attorney, Agent, or Firm* — Larson Newman, LLP

(57) ABSTRACT

A security lock is provided for a mobile device. The security lock includes a pair of locking elements and a pair of electromechanical actuators. Each locking element has a profile configured to complement a profile of a locking tab of an external locking assembly. Each electromechanical actuator is configured to engage an associated one of the locking elements to lock the locking tab to the mobile device, and to disengage the associated locking element to unlock the locking tab.

18 Claims, 4 Drawing Sheets

*(Lock Retracted)*

(Lock Engaged)

200

*(Lock)*

*(Unlock)*

INTEGRATED SECURITY LOCK

FIELD OF THE DISCLOSURE

This disclosure generally relates to information handling systems, and more particularly relates to providing a built in security lock for an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A security lock for a mobile device may include a pair of locking elements and a pair of electromechanical actuators. Each locking element may have a profile configured to complement a profile of a locking tab of an external locking assembly. Each electromechanical actuator may be configured to engage an associated one of the locking elements to lock the locking tab to the mobile device, and to disengage the associated locking element to unlock the locking tab.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
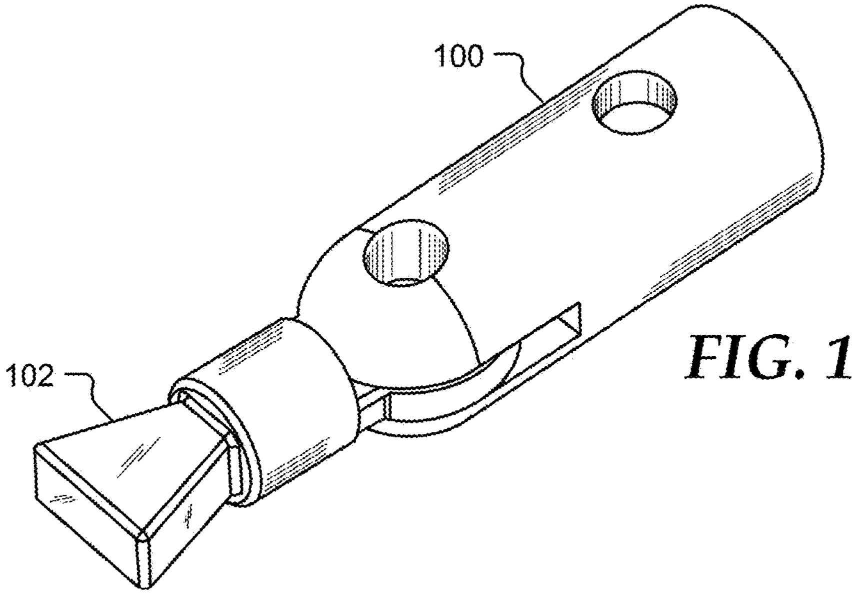
FIG. 1 illustrates a cable lock stud according to an embodiment of the current disclosure.

FIG. 1 illustrates a cable lock stud 100 for a cable lock system for locking mobile devices such as laptop systems, tablet devices, or the like. The cable lock system may include a cable that can be physically secured to a fixed object, such as a desk, a table, a wall, or the like, and that is attached to stud 100. Stud 100 includes a locking tab 102 that is inserted into a locking hold in the device to be locked, and is rigidly secured to the device, as described further below. Stud 100 is similar in profile to other types of cable lock systems. However, in the typical cable lock system, the locking tab is a mechanical mechanism that expands when inserted into the hole in the device. Such cable lock systems may typically utilize a key or a combination lock mechanism to maintain the expansion of the locking tab. Such typical cable lock systems suffer from the need to keep a key on hand, or to remember a combination for a lock, in order to unlock the device from the cable lock system. In contrast, stud 100 and locking tab 102 form a rigid member, and the locking mechanism is maintained within the device, as described below.

Figure 2A:
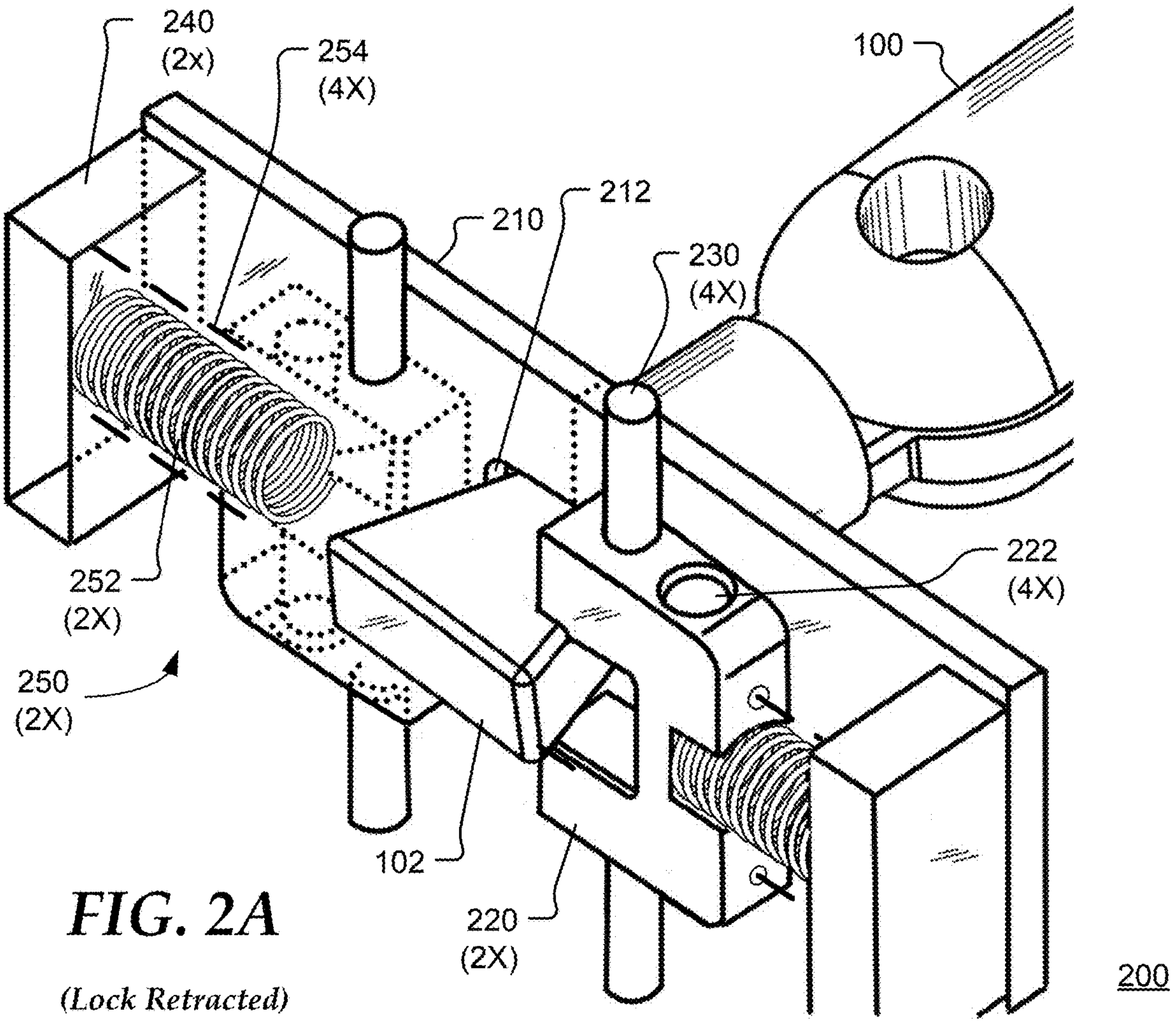
FIG. 2A illustrates a built-in security lock in a retracted position according to an embodiment of the current disclosure.

FIG. 2A illustrates a built in security lock 200 that operates to securely retain a mobile device 210 to a fixed object, by locking stud 100 to the mobile device. In particular, mobile device 210 has a security lock receptacle 212 that provides a fitted hole in the housing of the mobile device into which locking tab 102 is inserted. Security lock 200 includes two C-clamps 220, four locking pins 230, two mounting brackets 240, and two locking assemblies 250. As illustrated in FIG. 1A, security lock 200 is retracted, that is, C-clamps 220 are retracted as described further below, to permit the free insertion or removal of locking stud 100 from the security lock. C-clamps 220 each include two locking pin holes 222 (for a total of four locking pin holes). As illustrated, locking pins 230 are retracted and disengaged from locking pin holes 222 to permit C-clamps 220 to be retracted toward their associated mounting brackets 240, thereby clearing a space for locking tab 102 to be inserted or removed.

C-clamps 220 are each coupled to their associated mounting brackets by an associated one of locking assemblies 250. Locking assemblies 250 operate to either retract or engage their associated C-clamps 220. In this embodiment, the term "retract" means to draw C-clamps 220 outward toward their associated mounting brackets 240, and the term "engage"

means to drive the C-clamps toward each other and away from their associated mounting brackets. As such, locking assemblies 250 operate to mechanically move their associated C-clamps 220 outward to retract the C-clamps, or inward to engage the C-clamps. As illustrated, locking assemblies 250 each include a locking spring 252 and at least one element of muscle wire 254 (illustrated as two elements of muscle wire). Locking springs 252 are each rigidly affixed between their associated C-clamp 220 and their associated mounting bracket 240. Muscle wires 254 represent electrical elements that expand or contract with the application of a current to the muscle wires.

In a first embodiment, locking springs 252 are sprung to hold their associated C-clamps 220 in the retracted position. Then, in a first case, when no current is applied to muscle wires 254, the muscle wires are contracted, and so no current is needed to retract C-clamps 252. Thus in this case, in the unpowered state, C-clamps 220 are retracted. In a second case when a current is applied to muscle wires 254, the muscle wires are contracted, and so a current is needed to retract C-clamps 252. Thus in this case, in the unpowered state, C-clamps 250 are extended. In a second embodiment, locking springs 252 are sprung to hold their associated C-clamps 220 in the extended position. Then in a first case, when no current is applied to muscle wires 254, the muscle wires are extended, and so a current is needed to retract C-clamps 252. Thus in this case, in the unpowered state, C-clamps 220 are extended. In a second case when no current is applied to muscle wires 254, the muscle wires are contracted, and so no current is needed to retract locking springs 252. Thus in this case, in the unpowered state, C-clamps 250 are retracted.

Figure 2B:
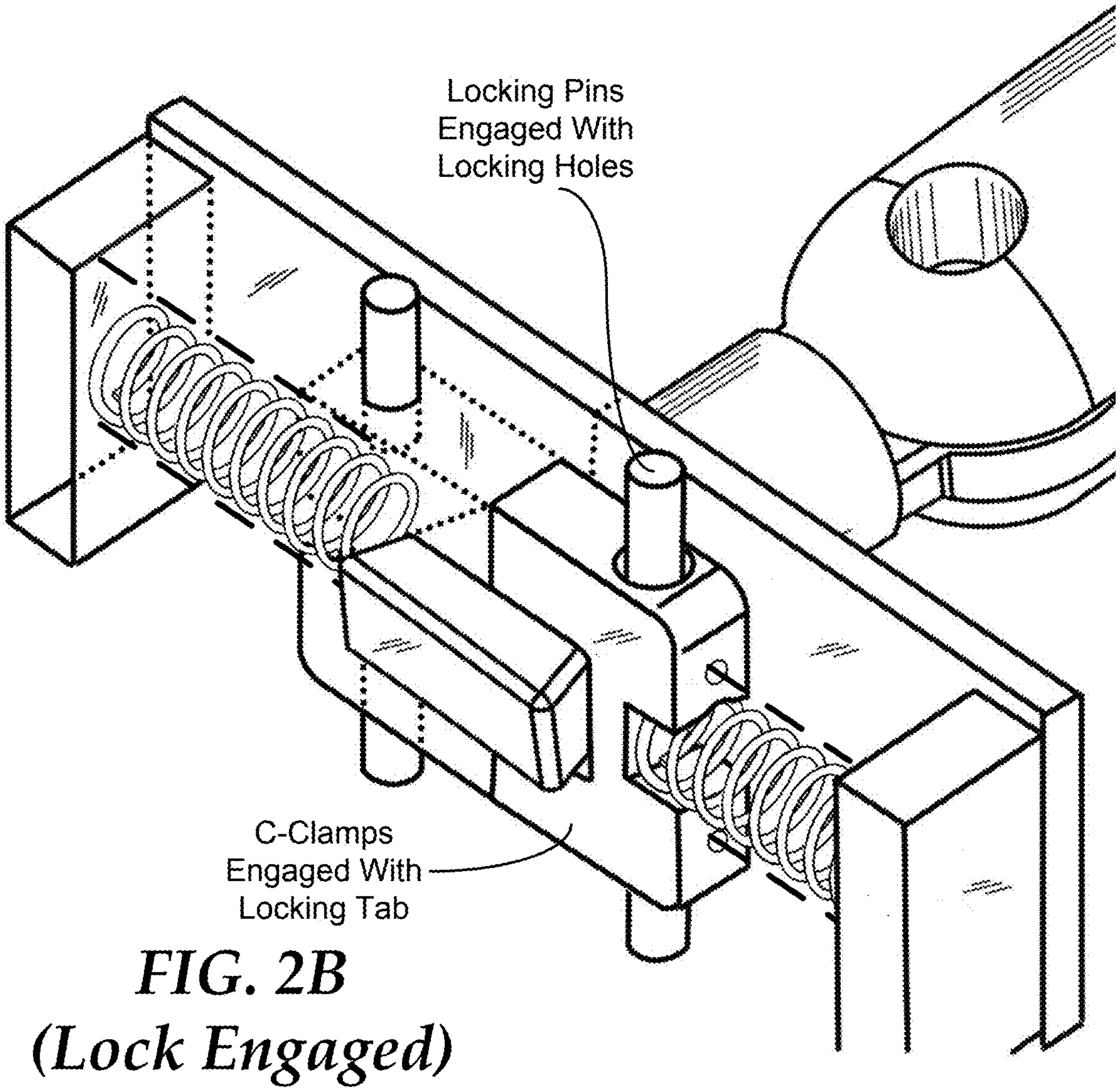
FIG. 2B illustrates the built-in security lock of FIG. 2A in a closed position.

FIG. 2B illustrates security lock 200 in the engaged state. C-clamps 220 are extended together to engage with locking tab 102 to securely retain stud 100 to mobile device 200. Locking tab 102 has a profile that is wider at the end of the locking tab that is farthest from stud 100, and that is narrower at the stud. This profile is complemented by a profile on C-clamps 220 that engage with the profile of locking tab 102 to securely retain stud when the C-clamps are engaged. However, it may be possible to force C-clamps 220 open given enough force is applied to remove stud 100. As such, when security lock 102 is in the engaged state, locking pins 230 are slid into locking holes 222 to more securely retain C-clamps 220 in the engaged state. Locking pins 230 are arranged such that the locking pins are recessed into a hole in the enclosure of mobile device 200 to hold the locking pins fast when the locking pins are slid into locking holes 222. To unlock security lock 200 and move C-clamps 220 to the retracted state, locking pins 230 must first be slid out from locking holes 222 before the C-clamps can be retracted. As such, locking pins 230 will be understood to be provided with actuators that operate to engage the locking pins with locking holes 222 and to disengage the locking pins from the locking holes. Such actuators may include muscle wires, solenoid actuators, such as where locking pins 230 are magnetized, linear actuators, or the like. Locking holes 222 may represent grooves provided in the surfaces of C-clamps 220, and locking pins 230 may be provided with tapered ends to engage with the grooves, as needed or desired.

Locking assemblies 250 may be provided by other mechanisms than the spring and muscle wire arrangement as shown in FIGS. 2A and 2B. For example a locking assembly may be provided by solenoid actuators with magnetized elements to provide the retracting and extending force to C-clamps 220, by linear actuators, by worm gears, by a motor or rack and pinion mechanism, or other actuators, as needed or desired. The functions of C-clamps 220 may be provided by overlapping sliders, as needed or desired. As illustrated locking tab 102 includes an angled profile that is complemented by the profile of C-clamps 220, but this is not the only complimentary profile. For example a notched locking tab may be matched with square-profiled C-clamps, or other complimentary profiles may be utilized, as needed or desired. However other profiles may not be backward compatible with existing locking pins, as may be provided by the currently illustrated embodiments. In another embodiment, the C-clamps are replaced by locking blocks that do not enclose the locking tab of the locking stud top and bottom, but that nevertheless engage with the locking tab with a complimentary profile to the locking tab, as needed or desired. In another embodiment, the C-clamps that are moved together to lock a locking tab are replaced with a pair of overlapping plates. When the plates are moved together, holes in the plates align to permit the insertion of the locking tab, and the plates are moved apart to engage locking surfaces on the plates to lock the locking tab.

Figure 3:
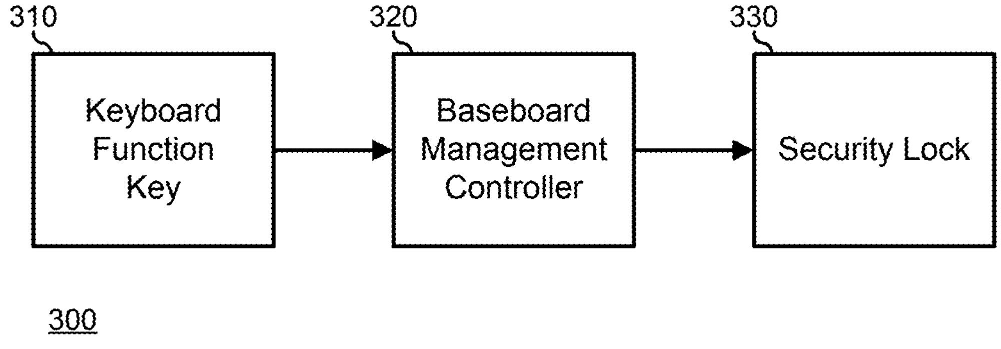
FIG. 3 illustrates a control mechanism for a security lock according to an embodiment of the current disclosure.

FIG. 3 illustrates a control mechanism 300 for a security lock. Control mechanism 300 includes a keyboard function key 310, a baseboard management controller (BMC) 320, and a security lock 330 similar to security lock 200. Keyboard function key 310 represents a human interface device on a mobile device, such as a key of a laptop computer keyboard, a portion of a touch screen device of a tablet device associated with a key of a keyboard, or the like. In a particular embodiment, keyboard function key 310 may represent a selectable option on a display of the mobile device, a separate switch or push button on the mobile device, or another mechanism whereby a user of the mobile device can enter a selection to engage an option on the mobile device. Keyboard function key 310 represents a selectable option associated with security lock 330 whereby a user of the mobile device can opt to lock or unlock security lock 330. Thus, when security lock 330 is locked, a user selection of keyboard function key 310 operates to indicate to BMC 320 that the user desires the security lock to be unlocked, and when the security lock is unlocked, a user selection of the keyboard function key operates to indicate the BMC that the user desires the security lock to be locked.

BMC 320 represents a processor subsystem of the mobile device that operates out of band from a host processing system of the mobile device. BMC 320 operates to receive the input from keyboard function key 310 to lock or unlock security lock 330, and to actuate the security lock in accordance with the keyboard input. In particular, BMC 320 may include one or more logic element, such as a complex programmable logic device (CPLD) that includes one or more general purpose input/output (GPIO) that is connected to the electrical actuators associated with security lock 330, that, under the direction of the BMC, are enabled to either lock or unlock the security lock. For example, a CPLD may be connected to one or more muscle wires associated with locking pins to engage or disengage the locking pins of the security lock, and may be connected to one or more muscle wires associated with the locking assemblies to extend or retract the C-clamps of the security lock. BMC 320 further operates to authenticate the use of the mobile device to ensure that the user has a privilege level needed to lock or unlock the security device. Such authentication may be provided by any authentication mechanism as may be known in the art, such as a username/password combination, an operating system authentication such as a Windows Hello authentication, a biometric authentication, or the like.

Figure 4A:
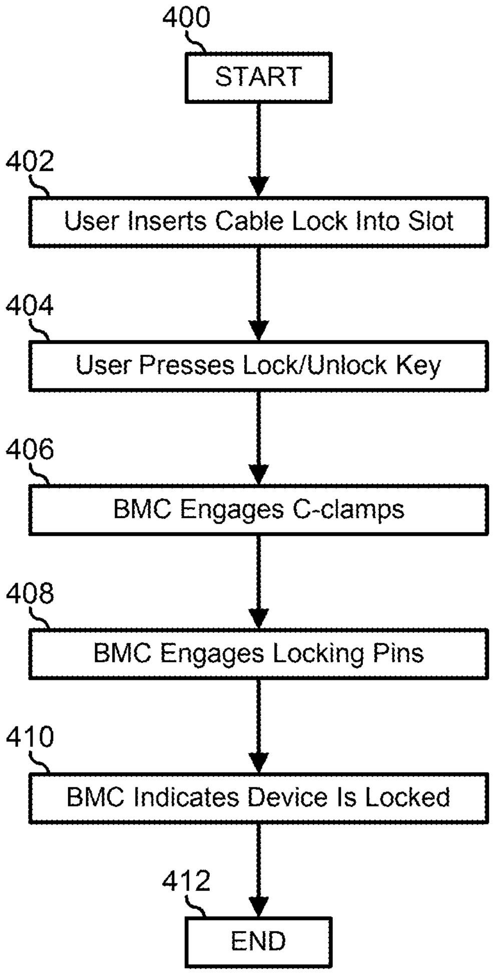
FIG. 4A is a flowchart illustrating a method for locking a security lock according to an embodiment of the current disclosure.

FIG. 4A illustrates a method for locking a security lock similar to security lock 200, starting at block 400. A user inserts a cable lock into a lock slot of a mobile device in block 402, and presses a lock/unlock key on the mobile device in block 404. A BMC of the mobile device engages the C-clamps of a security lock of the mobile device in block 406 and engages locking pins of the security lock in block 408. The BMC provides an indication back to the user that the mobile device is locked in block 410 and the method ends in block 412.

Figure 4B:
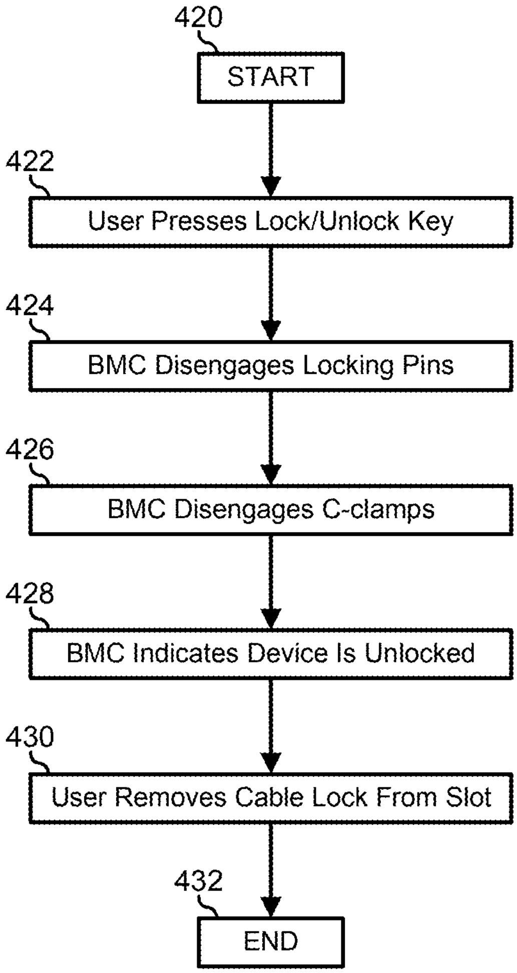
FIG. 4B is a flowchart illustrating a method for unlocking a security lock according to an embodiment of the current disclosure.

FIG. 4B illustrates a method for unlocking a security lock similar to security lock 200, starting at block 420. A user presses a lock/unlock key on the mobile device in block 422. A BMC of the mobile device disengages locking pins of a security lock in block 424 and disengages the C-clamps of the security lock of the mobile device in block 426. The BMC provides an indication back to the user that the mobile device is unlocked in block 428. The user removes the cable lock from the lock slot of the mobile device in block 430, and the method ends in block 432.

Figure 5:
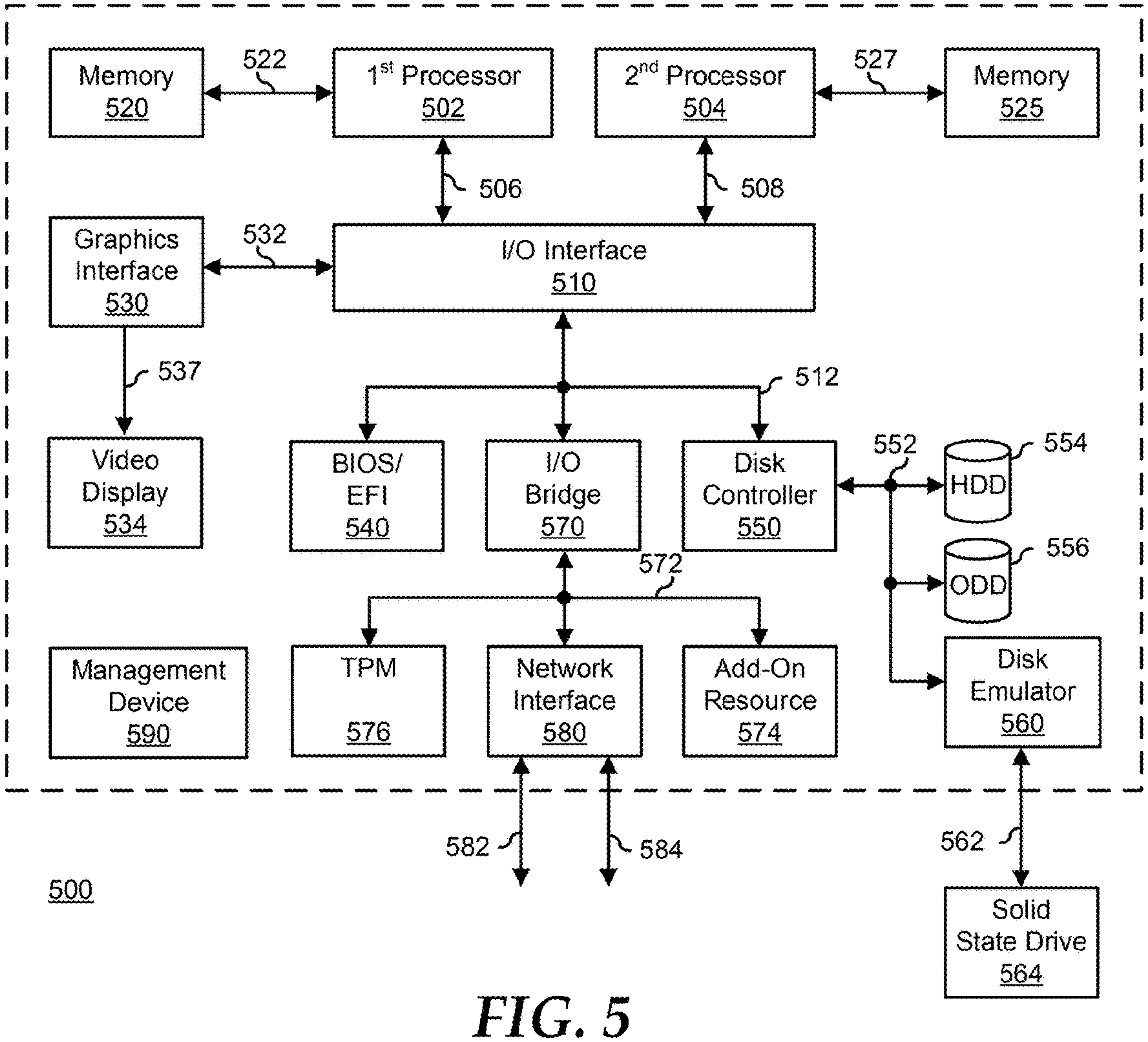
FIG. 5 is a block diagram illustrating a generalized information handling system according to another embodiment of the present disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 564, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 564, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 5394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A security lock within a housing of a mobile device, the security lock comprising:

an external locking assembly configured to be inserted into a receptacle in the housing, the external locking assembly having a first profile;

a pair of locking elements, each locking element having a second profile that is complimentary to the first profile when the pair of locking elements are engaged to lock the external locking assembly to the mobile device; and a pair of muscle wire actuators, each muscle wire actuator configured in a first state to engage an associated one of the locking elements to lock the locking tab to the mobile device, and in a second state to disengage the associated locking element to unlock the locking tab.

2. The security lock of claim 1, wherein the locking elements include C-clamps.

3. The security lock of claim 2, further including a locking pin associated with each C-clamp.

4. The security lock of claim 3, wherein each C-clamp is provided with a locking hole.

5. The security lock of claim 4, wherein, when locked, the security lock engages the locking pin in the locking hole, and when unlocked, the security lock disengages the locking pin from the locking hole.

6. The security lock of claim 1, further comprising:

a pair of springs, each spring associated with one of the muscle wire actuators and configured to maintain the associated locking element in a first position, wherein each associated and a muscle wire actuator moves the associated locking element to a second position.

7. The security lock of claim 6, wherein, when the locking element is in the first position, the security lock is unlocked, and when the locking element is in the second position, the security lock is locked.

8. The security lock of claim 6, wherein, when the locking element is in the first position, the security lock is locked, and when the locking element is in the second position, the security lock is unlocked.

9. The security lock of claim 1, wherein the muscle wire actuators are activated in response to a user input to the mobile device.

10. A method for providing a security lock within a housing of a mobile device, the method comprising:

providing an external locking assembly configured to be inserted into a receptacle in the housing, the external locking assembly having a first profile providing, in the security lock, a pair of locking elements, each locking element having a first profile that is complimentary to the first profile when the pair of locking elements are engaged to lock the external locking assembly to the mobile device;

providing, in the security lock, a pair of muscle wire actuators;

engaging in a first state, by each muscle wire actuator, an associated one of the locking elements to lock the locking tab to the mobile device; and disengaging in a second state, by each muscle wire actuator, the associated locking element to unlock the locking tab.

11. The method of claim 10, wherein the locking elements include C-clamps.

12. The method of claim 11, further comprising including, in each C-clamp, a locking pin.

13. The method of claim 12, further comprising providing each C-clamp with a locking hole.

14. The method of claim 13, further comprising:

engaging the locking pin in the locking hole when the security lock is locked; and disengaging the locking pin from the locking hole when the security lock is unlocked.

15. The method of claim 10, further comprising:

providing, a pair of springs, each spring associated with one of the muscle wire actuators and configured to maintain the associated locking element in a first position, wherein each associated muscle wire actuator moves the associated locking element to a second position.

16. The method of claim 15, wherein, when the locking element is in the first position, the security lock is unlocked, and when the locking element is in the second position, the security lock is locked.

17. The method of claim 15, wherein, when the locking element is in the first position, the security lock is locked, and when the locking element is in the second position, the security lock is unlocked.

18. A security lock for a mobile device, the security lock comprising:

an external locking assembly configured to be inserted into a receptacle in the housing, the external locking assembly having a first profile;

a pair of C-clamps, each C-clamp having a first profile that is complimentary to the first profile when the pair of locking elements are engaged to lock the external locking assembly to the mobile device;

a pair of muscle wire actuators, each muscle wire actuator configured in a first state to engage an associated one of the C-clamps to lock the locking tab to the mobile device, and in a second state to disengage the associated C-clamp to unlock the locking tab; and a pair of mounting brackets, each mounting bracket configured to secure an associated one of the muscle wire actuators.

* * * * *